(12) United States Patent
Hohmann, Jr.

(10) Patent No.: US 8,028,353 B1
(45) Date of Patent: Oct. 4, 2011

(54) FOAM INTERLINING DEVICE FOR SWIMMING POOLS

(75) Inventor: Ronald P. Hohmann, Jr., Hauppauge, NY (US)

(73) Assignee: Mitek Holdings, Inc., Wilmington, DE (US)

( * ) Notice: Subject to any disclaimer, the term of this patent is extended or adjusted under 35 U.S.C. 154(b) by 1453 days.

(21) Appl. No.: 11/486,529

(22) Filed: Jul. 13, 2006

(51) Int. Cl.
  *E04H 4/00* (2006.01)
  *B32B 7/12* (2006.01)
  *C04B 37/00* (2006.01)

(52) U.S. Cl. ............. 4/506; 4/580; 428/304.4; 428/343; 428/317.1; 428/317.3; 428/41.7; 428/41.8; 156/325; 156/327; 156/334

(58) Field of Classification Search .............. 4/501, 506, 4/507, 580–583; 52/169.7; 156/325, 327, 156/334; 428/343, 351–354
See application file for complete search history.

(56) References Cited

U.S. PATENT DOCUMENTS

| | | | |
|---|---|---|---|
| 3,429,085 A | | 2/1969 | Stillman, Jr. |
| 3,644,941 A | * | 2/1972 | Kuss ........................... 52/169.7 |
| 3,644,942 A | | 2/1972 | Haight |
| 3,970,771 A | | 7/1976 | Davison |
| 4,064,571 A | | 12/1977 | Phipps |
| 4,118,809 A | * | 10/1978 | Bertsch ........................... 52/149 |
| 5,106,447 A | * | 4/1992 | Di Rado et al. ................ 156/334 |
| 5,398,351 A | | 3/1995 | Watson |
| 5,953,867 A | | 9/1999 | Colletto |
| 6,106,916 A | * | 8/2000 | Lukowski, Sr. ............... 428/40.1 |
| 6,296,730 B1 | | 10/2001 | Williams |
| 6,451,398 B1 | * | 9/2002 | Sylvester ...................... 428/41.8 |
| 6,551,425 B2 | * | 4/2003 | Sylvester ......................... 156/79 |
| 6,662,383 B2 | | 12/2003 | Cornelius |

OTHER PUBLICATIONS

Gladon Company, Inc., Here's What You Need to Setup an Above Ground Swimming Pool, http://gladon.com/setup.htm.
Aquaflex Vinyl Engineering Inc., Pool Liners, http://www.poolliner.com/.
Southern Indiana Manufacturing Co., Pleasure Pools, http://pleasurepoolsandloghomes.com/bg_pools%20by%20pleasure%20pools.htm.

* cited by examiner

*Primary Examiner* — Gregory Huson
*Assistant Examiner* — Janie Christiansen
(74) *Attorney, Agent, or Firm* — Silber & Fridman

(57) ABSTRACT

A foam interlining device for swimming pools with pressure activated adhesive is shown. The device is disposed between the pool liner and the swimming pool backup wall. The interlining is also constructed with both a mounting adhesive and a self-sealing coating. The self-sealing coating seals minor punctures and tears of the pool liner. In one embodiment, the edge of the interlining also functions as an expansion joint between a deck and the swimming pool coping and as an underlayment or sill seal for the coping. The interlining device is also shown premounted on the backup-wall-side of the pool liner.

5 Claims, 3 Drawing Sheets

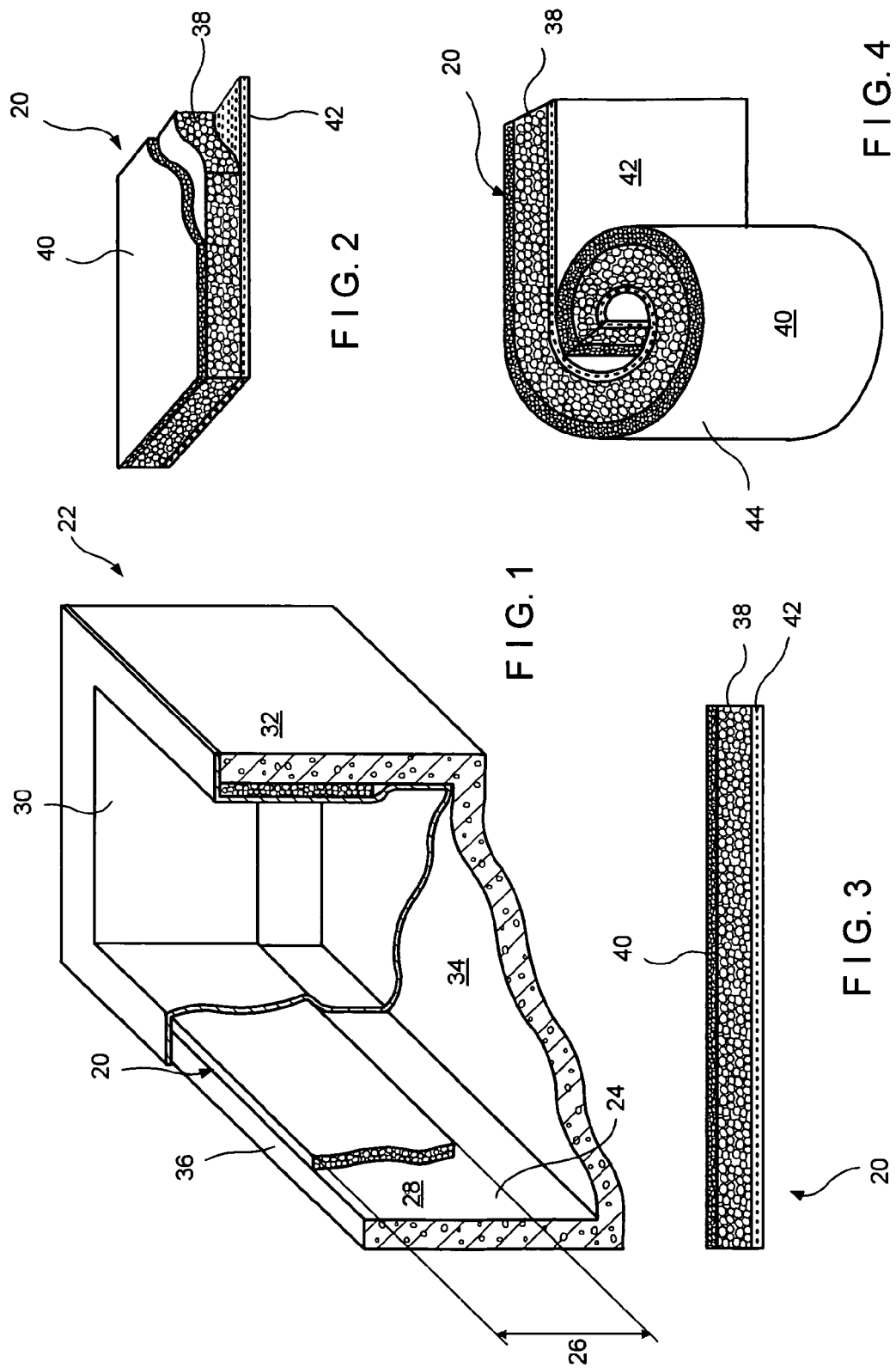

FOAM INTERLINING DEVICE FOR SWIMMING POOLS

BACKGROUND OF THE INVENTION

1. Field of the Invention

This invention relates to an adhesive-bearing, interlining for installation between the backup wall and the liner of a swimming pool. In general terms, the interlining softens any shocks experienced by the liner and thereby acts as a protective shield. The interlining has significant insulative qualities and further serves to reduce thermal losses from the swimming pool. Thus, in geographic areas requiring pool heating the interlining enhances energy conservation. In one embodiment, the polymeric foam interlining is coated on both sides with adhesives—a mounting adhesive with appropriate tackiness for adhering to a concrete or metal backup wall on one side and a self-sealing adhesive with appropriate tackiness for sealing minor punctures and tears in the liner on the other side.

2. Description of the Prior Art

In the past swimming pools have been constructed with various backup walls of concrete or metal which, in turn, have been adapted to in-ground and above-ground structures. To these walls, liners have been attached by an endless variety of wall-to-liner connections. There has been some use of polymeric foam in and around such walls.

In a patent to Watson, U.S. Pat. No. 5,398,351, the use of planar structural foam sections is described for underlayment of above-ground pools. These panels are installed in a tile-like arrangement with caulking and taping thereover. This application cushions the swimmer impact on the bottom of the pool and helps prevent or reduce the severity of shallow diving injuries. Other patents describe the use of rigid foam panels surrounding above-ground pools as insulation for heat loss reduction.

In Cornelius et al., U.S. Pat. No. 6,662,383, a polyvinyl chloride (PVC) liner installation is described as first requiring laying a fiber blanket over the walls of the pool. This, according to the patent specification, allows the PVC liner to expand and contract with the underlying pool structure.

In the marketplace, several companies offer foam materials and spray adhesive to apply to the backup walls of swimming pools. The task of application is awkward, messy, and time-consuming and is somewhat akin to an old fashioned wallpapering task. The awkwardness exceeds the wallpapering task as in this case the foam rolls are 3.5 ft. by 125 ft.

Because the inventor hereof has extensive experience in developing and marketing peel-and-stick products for the building construction industry, the development of the within foam interlining has the benefit of the most advanced adhesive technology.

The pool liners are customarily and popularly structured from PVC and known as vinyl liners. The vinyl liners are frequently available in brilliant designer prints and are as a result highly decorative. Most vinyl liners are in the range of a 30 mil. thickness and, with use, are subject to minor punctures and tears that lead to water leaking into the interstitial area between the liner and the backup wall. This most frequently occurs in the uppermost 3 ft. Of the swimming pool.

Leaking liners has been addressed by such patents as William et al., U.S. Pat. No. 6,296,730 which provides for application of underwater patches with adhesives suitable for use in an aqueous environment. Over time the repetitive use of patches, even with the best color matching, leads to a rather unaesthetic patchwork arrangement.

A more sophisticated approach to the leaking liner problem is attempted by Cornelius et al. In their U.S. Pat. No. 6,662,383 wherein a secondary liner sheet is heat sealed to the main liner. The patent describes the secondary or protective liner as extending part way or completely downwardly to the bottom of the main liner sheet.

While the above litany of technological shortcomings of swimming pool construction is not intended to be an exhaustive treatment of the subject matter, the reader of the specification which follows will discover that these and other problems are discussed. Especial emphasis will be placed on ease of installation, protection of the liner, use of advanced materials, and energy conservation through reduction of thermal losses.

SUMMARY

In the description which follows, a foam interlining device is shown in detail. The foam interlining device in the simplest embodiment is a foam web, which is adapted for disposition between the uppermost portion of the backup wall of the swimming pool and the pool liner, with a hot melt, pressure-activated mounting adhesive on one side of the foam web. In this embodiment a self-skinned layer is on the other side of the foam web, which layer is releasably adherable to the adhesive layer.

With the releasable adhesion of the foam interlining device, the device is enabled, without a release sheet in the roll, to be rolled upon itself. While the roll of foam is still of the same dimension as described above, approximately 3.5 ft. by 125 ft., the roll becomes less cumbersome and more manageable as there is no separate application of spray-on adhesive. The device applies readily to the perimeter of the pool in a manner requiring less manpower than the prior art wall foam.

The hot melt adhesive layer is formulated for pressure activation and compatibility with the polymeric foam of the foam web. The adhesive employed for mounting purposes has sufficient tackifier resin to durably adhere to the rough surface of a concrete backup wall.

In the second embodiment of the foam interlining device, a unique installation is shown. The upper edge portion of the device has two distinct functions, namely, as an expansion joint between the pool deck and the coping and as a coping underlayment between the coping and the top of the backup wall. The expansion joint function compensates for the differential thermal expansion of the coping material and the deck material. The coping underlayment function acts as a sill seal and precludes water from backing up into the backup wall structure.

This embodiment further includes a self-sealing adhesive layer which, upon the occurrence of minor punctures and tears in the swimming pool liner, seals the openings caused thereby. While this adhesive is within the same claimed formulation range as the mounting adhesive, the tackifier resin is selectable to suit the required function. Like the first embodiment, this foam interlining device is mounted on the backup wall prior to the installation of the pool liner.

In the third embodiment of the foam interlining device, the device is mounted by a pool liner manufacturer on the pool liner prior to installation thereof in the swimming pool. Here, the mounting adhesive also serves as a self-sealing adhesive. As the self-sealing function exceeds the low adhesion requirement (foam-to-vinyl) of the mounting function, the self-sealing specification controls. Here, the mounting adhesive for the foam-bearing-liner-to-backup-wall connection is covered with a release sheet.

OBJECTS AND FEATURES OF THE INVENTION

It is an object of the present invention to provide a foam interlining for swimming pools that is readily installed utilizing a pressure-activated, hot melt adhesive which, upon activation, strongly adheres to the rough and porous surfaces of the backup wall.

It is a further object of the present invention to have a foam interlining with a polymeric foam margin to provide an expansion joint between a deck and the coping and an underlayment for the coping.

It is another object of the present invention to provide a foam interlining device having an additional layer of adhesive utilizable to self-seal the pool liner upon the occurrence of minor punctures or tears.

It is yet another object of the present invention to provide a labor-saving interlining device which utilizes advanced technology adhesives that are easy and economical to install in building and refurbishing swimming pools.

It is still yet another object of the present invention to provide a foam interlining device forming a continuous band about the uppermost portion of the swimming pool and provide thermal insulation therefor.

It is a feature of the present invention that the hot melt adhesive hereof does not adhere to the self-skinned surface enabling the foam interlining device to be conveniently packaged in a roll form without a release sheet.

It is another feature of the present invention that minor punctures and tears in the pool liner are sealed by the self-sealing interlining device.

It is yet another feature of the present invention that, upon installation and with a portion of the foam interlining device under the swimming pool coping, water from the pool cannot enter the space between the pool liner and the backup wall.

Other objects and features of the present invention will become apparent upon reviewing the drawing and reading the detailed description which follows.

BRIEF DESCRIPTION OF THE DRAWINGS

In the following drawings, the same parts in the various views are afforded the same reference designators.

FIG. 1 is a perspective view of a first embodiment of a foam interlining device of this invention and shows a swimming pool with a poured concrete backup wall and a pool liner with the pool liner broken away to show the foam interlining device positioned against the uppermost portion of the backup wall;

FIG. 2 is a schematic view of the foam interlining device of FIG. 1 partially broken away to show the structure thereof;;

FIG. 3 is a cross-sectional schematic view of the foam interlining device of FIG. 2;

FIG. 4 is a perspective of the uninstalled foam interlining device in roll form;

DESCRIPTION OF THE PREFERRED EMBODIMENTS

Figure 5:
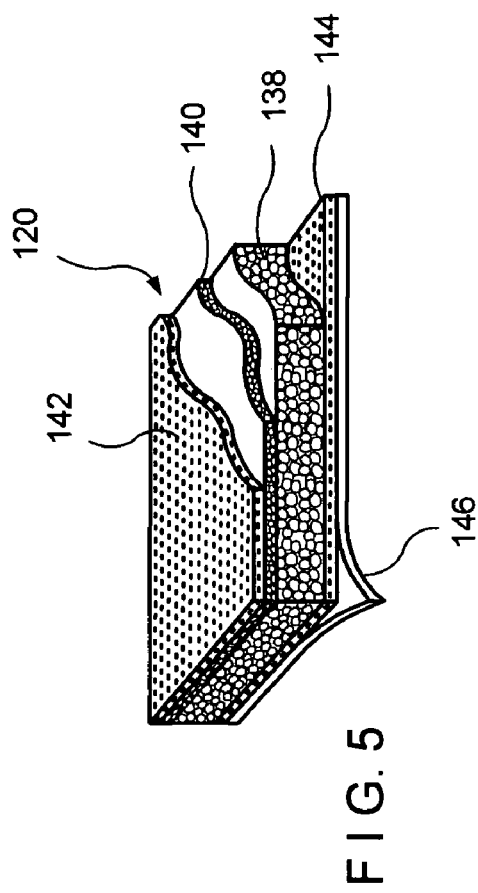
FIG. 5 is a schematic view of a second embodiment of a foam interlining device of this invention, similar to FIG. 2, but showing a self-sealing adhesive layer and a release sheet added to the device structure.

In the foam interlining device of this invention, pressure-activated adhesives are used to dispose a foam web between the backup wall of the swimming pool and the pool liner (and to position the foam web at the uppermost position of the swimming pool. The foam interlining device serves to protect the uppermost 3 ft. of the pool liner, which protection is in the region wherein most of the swimming pool action takes place. The foam interlining device completely wraps about the pool perimeter and affords thermal insulation for the swimming pool. In the second and third embodiments, an adhesive layer is provided that makes the pool liner self-sealing. In the second embodiment, as is explained hereinbelow, the uppermost edge of the device functions as an expansion joint and a coping underlayment or sill seal.

Referring now to FIGS. 1 through 4, the first embodiment of this invention of a foam interlining device is shown. Here, the foam interlining device, referred to generally by the reference designator 20 is illustrated as being applied to an in-ground swimming pool 22 and is disposed on a poured concrete wall 24 and specifically to the uppermost portion 26 thereof. The surface 28 of concrete wall 24 dries to a rough and irregular finish.

The swimming pool 22 is constructed to include a liner 30 which extends over the pool sides 32 and pool bottom 34. In FIG. 1, the liner 30 is cutaway to show the foam interlining device 20 and the pool structure. Most commonly the liner 30 depends from retaining means incorporated into the pool edging or coping (not shown) which, in turn, is mounted on the top 36 of wall 24.

In FIG. 2 a schematic view of the foam interlining device 20 is shown in perspective. The foam layer or web 38 is constructed from a polymeric foam, and is preferably chosen from noncrosslinked polyethylene, low-density polyethylene foam, crosslinked polyethylene, and high density polyethylene foam. For purposes of this embodiment, the foam web 38 has a skin 40 disposed on one side thereof of the same material and is more familiarly described as self-skinned. On the other side of the foam web 38, the foam interlining device 20 is constructed to include an adhesive layer 42.

The self-skin layer 40 is releasably adherable to the adhesive layer 42 enabling the foam interlining device to be rolled upon itself in the form of roll 44, FIG. 4. The roll 44 is typically presented in a 125 ft. by 3.5 ft. format with the foam layer 38 being from 1/16 to 3/8 in. thick. Presented in this form installation is simpler and labor costs are reduced.

The adhesive layer 42 is selected from hot melt adhesive, solvent-based adhesive, water-based adhesive or of other types such as UV-cured polymer. The applied adhesive is preferably tacky, especially for adhesive layer 48 which is pressure activated. Suitable hot melt adhesives may contain such ingredients as polymers such as butyl rubber, styrene-butadiene-styrene (SBS), styrene-isoprene-styrene (SIS), styrene butadiene (SB), styrene-ethylene-butadiene-styrene (SEBS) and ethylenevinylacetate (EVA); resins such as those of the hydrocarbon and rosin types, natural and petroleum waxes, oils, and others. Solvent-based adhesives may contain ingredients such as those listed above, dissolved or dispersed in a solvent vehicle. Water based adhesives would normally be based on emulsions of polymeric materials. Suitable polymeric materials would include vinyl acetate and acrylic polymers and copolymers such as vinyl acetate acrylic, ethylene vinyl acetate as well as styrene acrylic, vinyl chloride acrylic, vinyl versatate and others.

From a production standpoint, the hot-melt adhesives for layer 42 may be simply melted for application and need not emit solvent which is an environmental pollutant and may require re-condensation. The adhesive may suitably be applied at a thickness of 0.001 inches to 0.1 inch, but is preferably applied at a thickness of 0.003 inches to 0.025 inches and most preferably at a thickness of 0.005 inches to 0.02 inches.

Referring again to FIG. 4, the hot melt adhesive layer 42 is formulated for pressure activation and compatibility with the foam web 38 adhered thereto. The adhesives described herein are particularly useful for applications in swimming pool construction as such adhesives are readily pressure activated. The adhesive is formulated so that, in case of fire, the coatings thereof will not contribute to smoke or accelerate flame spreading and thus do not require inorganic fillers which are known to interfere with the adhesive function. Also, the adhesives are formulated to have sufficient tackiness so that a durable bond between the interlining 20 and the rough and porous surface of the concrete or masonry wall 24 is experienced. The resilience of the overall structure permits abutting seams with complete sealing without caulks, tapes or sealants being required. This results in a smooth surface for emplacement of liner 30.

The adhesive is formulated to optimize stability in the aqueous environment of the swimming pool and thus coatings thereof will not contribute to mold or fungal growth. The adhesive layer 42 may optionally include an inorganic material, such as an alkali-resistant fiber glass. This additive enhances the overall thermal insulation of the foam interlining and provides multidirectional reinforcement. Alternative, to being doped with the fiber glass additive, the interlining may be strengthened using polymeric fiber fragments. Also, the fiber-doped adhesive layer is formulated to have sufficient tackiness so that a durable bond between the interlining and the rough and/or porous surface of the backup wall is experienced. The overall coverage of the adhesive on the interlining permits abutting of the widths of interlining and precludes the use of caulks and tapes at the joints so as to result in a smooth surface with superior flatness.

Incorporating by reference the Di Rado et al. patent, U.S. Pat. No. 5,106,447, the hot melt adhesive compositions of hot melt layer 56 may be prepared from 10 to 50 weight percent of a thermoplastic elastomer, namely, thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90 degrees C.; and, 0 to 2 percent of a stabilizer.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins; (3) aliphatic petroleum hydrocarbon resins; and, (4) partially and fully hydrogenated hydrocarbon resins.

The polyterpene resins have a having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatec resins sold by Arizona, and the Piccolyte S-10, S-25, S-40, S-85, S-100, S-115, S-125 and S-135 resins as sold by Hercules Chemical.

The aliphatic petroleum hydrocarbon resins have a Ball and

Ring softening point of from about 80 degrees C. to 160 degrees C., resulting from polymerization of monomers consisting primarily of carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation.

Examples of the partially and fully hydrogenated hydrocarbon resins are resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

Where the foam interlining has adhesives on both major surfaces of the foam web, a suitable release paper is applied thereover. With the double-sided, adhesive-coated interlining, the interlining is first applied to the backup wall, and, upon the removal of the release paper, the swimming pool liner is applied to the surface of the interlining. The application to the backup wall utilizes a hand-operated laminating roller to provide the pressure activation.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris(3,5-di-tert-butyl-4-hydroxy-benzyl)benzene; pentaerythrityl tetrakis-3 (3,5-di-tert-butyl-4-hydroxyphenyl)propionate; 4,4'methylenbis(2, 6-tert-butyl-phenol); 4,4'-thiobis (6-tert-butyl-o-cresol); 2,6-di-tertbutylphenol; 6-(4-hydroxyphenoxy)-2,4-bis(-octyl-thio)-1,3,5-triazine; di-n-octadecyl 3,5-di-tert-butyl-4-hydroxy-benzylphosphonate; 2-(n-octylthio)-ethyl 3,5-di-tert-butyl-4-hydroxybenzoate; and sorbitol hexa [3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.00. Besides the glass fiber reinforcing agent mentioned above, other additives such as flow modifiers, pigments, dyestuffs, etc., which are conventionally added to hot melt adhesives for various end uses may also be incorporated in minor amounts into the formulations of the present invention.

Figure 7:
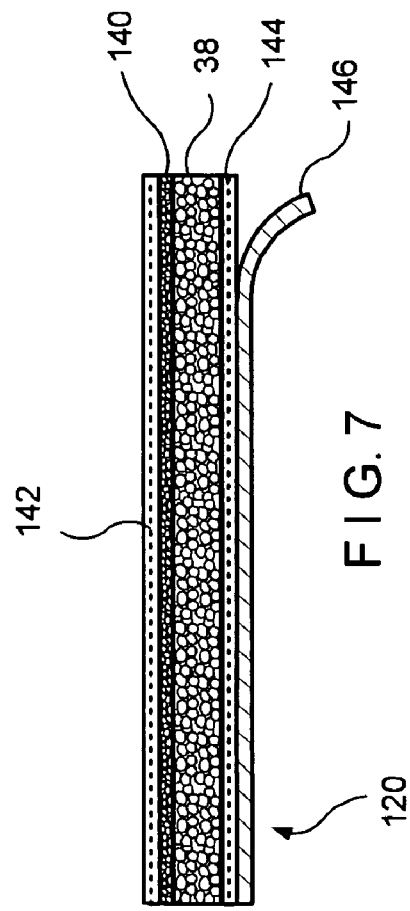
FIG. 7 is a cross-sectional schematic view of the foam interlining device of FIG. 5.
Figure 6:
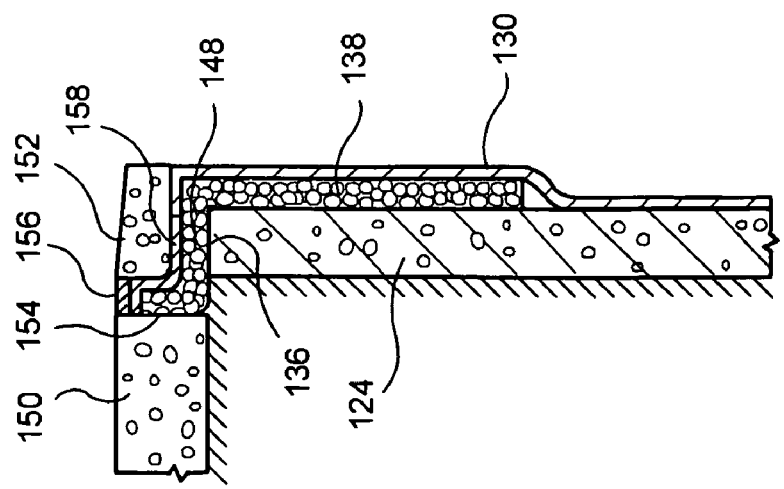
FIG. 6 is a cross-sectional view of the installed foam interlining device with an expansion joint portion, a coping underlayment portion, and an interlining portion.

Referring now to FIGS. 5, 6 and 7, the second embodiment of this invention of a foam interlining device is shown. Here, the foam interlining device is referred to generally by the reference designator 120. In this embodiment, similar parts to those of the first embodiment are referred to by reference designators 100 units higher than a similar part in the first embodiment. Thus, for example, the foam web 38 in the first embodiment have analogous foam web 138 in the second embodiment. Here, as the foam interlining device 130 is designed to function with the swimming pool structure already shown and described, the swimming pool details are not repeated. As in the first embodiment an adhesive layer secures the foam interlining device to the backup wall of the swimming pool.

In this embodiment, a foam interlining device 120 is constructed with a foam web 138 having an optional self-skinned covering 140 thereover and a mounting adhesive 142, all of which being of a similar nature to the corresponding parts of the first embodiment. The mounting 142 of the second embodiment is optionally an admixture of a hot melt adhesive (adapted as described above for sufficient tack) and a butylated adhesive. The latter is present in the total mixture in the range of 5 to 40 percent. In the present case, a 75 percent hot melt adhesive and a 25 percent butylated adhesive mixture provided a non-drool mounting adhesive 142 which, upon curing, has a melting point of 225° F. This aspect satisfied the stability requirement when the melting point was above 200° F. To this, there is added a second adhesive layer or self-sealing layer 144 and release sheet 146.

Upon installation of the liner 130, the release sheet 146 is removed and the liner 130 is adhered to the self-sealing adhesive layer 144. When the mounting adhesive 142 is all hot melt (not an admixture, as above) the self-sealing adhesive 144 may be identical to the mounting adhesive layer 142, however, depending on the application (e.g. concrete or metal backup wall) adhesives of differing tackiness may be desirable. The self-sealing adhesive is selected for its ability to seal minor punctures and tears in liner 130.

The foam interlining device 120 of this embodiment is installed so that one edge thereof serves the dual function of expansion joint and coping underlayment or sill seal. In FIG. 6, a cross-sectional view of the installation is shown. The upper edge 148 of the foam interlining device 120 is pulled over the top of the backup wall 124 so as to be disposed between deck 150 and coping 152. Here, an expansion joint portion 154 of foam interlining device 120 compensates for the differential expansion and contraction of the deck 150 and the coping 152. The joint is completed with a bead of caulking 156.

The foam interlining device 120 is then continued under coping 152 with a coping underlayment or sill seal portion 158 of the foam interlining device 120 atop top 136 of wall 124. The sill seal 158 precludes water infiltration below the coping 152 and inhibits unwanted mold and fungal growth.

From the top 136 of wall 124, the foam interlining device 120 continues downwardly between wall 124 and liner 130 with the mounting adhesive layer 142 filling the interstitial area between the wall 124 and the foam web 138 and the self-sealing adhesive layer 144, between the foam web 138 and the liner 130. With the installation as described, the liner 130 is protected from impact and the self-sealing adhesive layer 144 seals minor punctures and tears.

Figure 9:
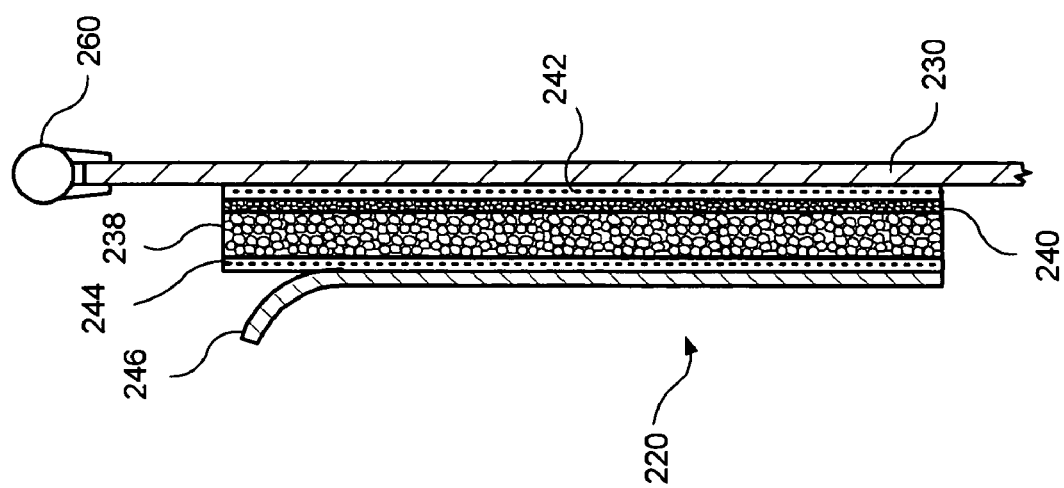
Figure 8:
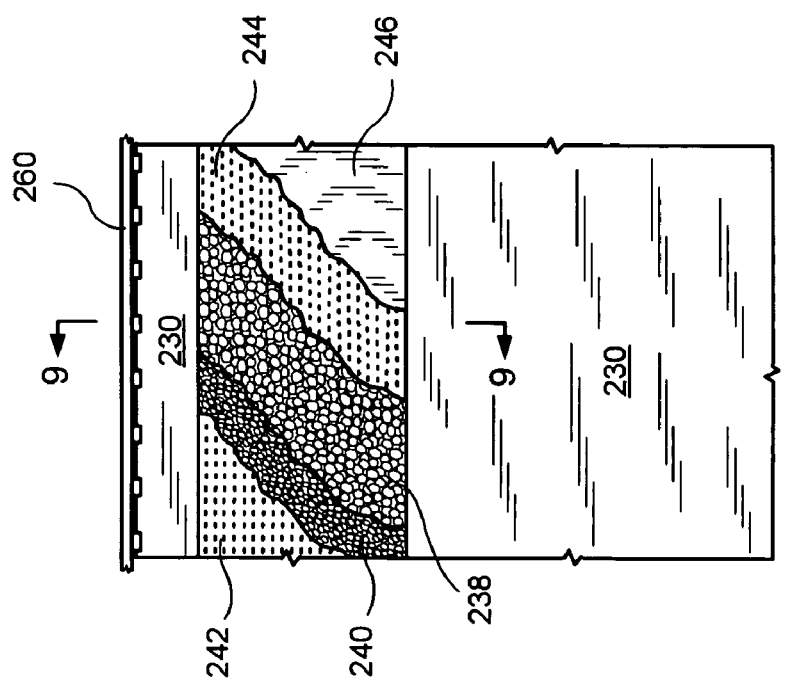
FIG. 8 is a front elevational view of a third embodiment of the foam interlining device of this invention shown premounted on a bead-type pool liner; and, FIG. 9 is a cross-sectional schematic view of the foam interlining device of FIG. 8.

Referring now to FIGS. 8 and 9, the third embodiment of this invention of a foam interlining device is shown. Here, the foam interlining device is referred to generally by the reference designator 220. In this embodiment, similar parts to those of the second embodiment are referred to by reference designators 100 units higher than a similar part in the second embodiment. Thus, for example, the foam web 138 in the second embodiment has an analogous foam web 238 in the third embodiment. This embodiment encompasses the providing of an interlining in the manufacture of a swimming pool liner.

FIGS. 8 and 9 illustrate a swimming pool liner 230 having a foam interlining device 220 pre-mounted thereon. The liner 230 has a bead 260 adapting the unit for mounting in a bead receptor (not shown) incorporated into a coping or the top of the pool wall. In FIG. 8 layers are broken away to show in a manner similar to FIG. 5, a foam web 238, a mounting adhesive layer 242, and a release sheet 246.

In the third embodiment, the adhesive layer between the liner 230 and the foam web 238 of the foam interlining device 220 serves a dual purpose, namely, as a mounting adhesive and as a self-sealing adhesive layer. Here the requirements of the self-sealing adhesive layer dictates the formulation. Especially since the foam layer is being adhered to a polyvinyl chloride sheet. The pre-mounting of the foam interlining device 220 has the advantage of insuring that air is not entrapped between the liner 230 and the foam web 238. Entrapping air would cause the self-sealing function to be less reliable.

Referring now to FIG. 9, a cross section is shown that illustrates the various layers of the premounted foam interlining device including the outermost mounting adhesive 242 and the release sheet 246 therefor.

While the present invention has been described herein by the preferred embodiments, it will be understood to those skilled in the art that various changes may be made and added to the invention. The changes and alternatives are considered within the spirit and scope of the present invention.

What is claimed is:

1. A swimming pool foam interlining device for use in a swimming pool structure having a backup wall about the perimeter thereof and a liner disposed thereon, said foam interlining device comprising:

a foam web having two major surfaces, said foam web being an elongated web of polymeric foam material selected from a group consisting of an open cell foam structure, a closed cell foam structure, and a foam structure of open and closed cells, said foam web adapted for disposition between the uppermost portion of said backup wall and said liner;

a mounting adhesive layer disposed on one of said two major surfaces of said foam web, said mounting adhesive being a high-strength pressure activated adhesive having sufficient tack to vertically adhere upon pressure activation to said backup wall, said mounting adhesive layer being an admixture of a thermoplastic elastomer, a tackifier resin and an amorphous diluent proportioned to provide, upon pressure activation, adequate adhesion, and wherein said mounting adhesive layer comprises about 10 to 50 percent by weight of a thermoplastic elastomer; about 5.5 to 10 percent by weight selected from a group consisting of ethylene, propylene, styrene, and mixtures thereof; about 20 to 50 percent of a tackifier resin; 15 to 50 percent by weight of an amorphous diluent; and, 0 to 2 percent by weight of a stabilizer;

a self-skinned layer disposed on said major surface of said foam web opposite said mounting adhesive layer, said self-skinned layer releasably adherable to said adhesive layer enabling said foam interlining device to be rolled upon itself without a release sheet therebetween; and, said foam interlining device, upon installation on said backup wall, providing protection for said liner and thermal insulation for said swimming pool.

2. A foam interlining device as described in claim 1 wherein said mounting adhesive layer is an admixture of a thermoplastic elastomer, a tackifier resin and an amorphous diluent proportioned to provide, upon pressure activation, adequate adhesion.

3. A swimming pool foam interlining device for use in a swimming pool structure having a backup wall about the perimeter thereof, a coping atop said backup wall and extending at least to the interior surface thereof, a pool liner extending downward from said coping, and a deck extending rearward from said coping, said foam interlining device comprising:

a foam web having two major surfaces, said foam web being an elongated web of polymeric foam material selected from a group consisting of an open cell foam structure, a closed cell foam structure, and a foam structure of open and closed cells, said foam web adapted for disposition between said uppermost portion of said backup wall and said liner, for disposition between said backup wall and said coping, and, for disposition between said coping and said deck, said foam web further comprising:

an expansion joint portion, upon installation in the joint between said coping and said deck, adapted to compensate for the differential expansion and contraction of said coping and said deck over the ambient temperature range;

a coping underlayment portion, upon installation between said backup wall and said coping, adapted to provide a waterproof seal therefor; and, an interlining portion, upon installation between said uppermost portion of said backup wall and said liner, adapted to protect said liner and to provide thermal insulation for said swimming pool; and, a mounting adhesive layer disposed on one of said two major surfaces of said foam web, said mounting adhesive being a high-strength pressure activated adhesive having sufficient tack to vertically adhere upon pressure activation to said backup wall, said mounting adhesive layer being an admixture of a thermoplastic elastomer, a tackifier resin and an amorphous diluent proportioned to provide, upon pressure activation, adequate adhesion; and, wherein said mounting adhesive layer comprises about 10 to 50 percent by weight of a thermoplastic elastomer; about 5.5 to 10 percent by weight selected from a group consisting of ethylene, propylene, styrene, and mixtures thereof; about 20 to 50 percent of a tackifier resin; 15 to 50 percent by weight of an amorphous diluent; and, 0 to 2 percent by weight of a stabilizer; and a self-skinned layer disposed on said major surface of said foam web opposite said mounting adhesive layer, said self-skinned layer releasably adherable to said adhesive layer enabling said foam interlining device to be rolled upon itself without a release sheet therebetween.

4. A foam interlining device as described in claim 3 wherein said mounting adhesive layer is an admixture of a thermoplastic elastomer, a tackifier resin and an amorphous diluent proportioned to provide, upon pressure activation, adequate adhesion.

5. A swimming pool foam interlining device for use in a swimming pool structure having a backup wall about the perimeter thereof and a liner for attachment thereto, said liner, when installed, having an uppermost portion thereof corresponding to the uppermost portion of said backup wall, said foam interlining device comprising:

a foam web having two major surfaces, said foam web being an elongated web of polymeric foam material selected from a group consisting of an open cell foam structure, a closed cell foam structure, and a foam structure of open and closed cells, said foam web adapted for disposition between the uppermost portion of said backup wall and said liner;

a mounting adhesive layer disposed on one of said two major surfaces of said foam web, said mounting adhesive being a high-strength pressure activated adhesive having sufficient tack to vertically adhere upon pressure activation to said backup wall, said mounting adhesive layer being an admixture of a thermoplastic elastomer, a tackifier resin and an amorphous diluent proportioned to provide, upon pressure activation, adequate adhesion and wherein said mounting adhesive layer comprises about 10 to 50 percent by weight of a thermoplastic elastomer; about 5.5 to 10 percent by weight selected from a group consisting of ethylene, propylene, styrene, and mixtures thereof; about 20 to 50 percent of a tackifier resin; 15 to 50 percent by weight of an amorphous diluent; and, 0 to 2 percent by weight of a stabilizer; and a self-skinned layer disposed on said major surface of said foam web opposite said mounting adhesive layer, said self-skinned layer releasably adherable to said adhesive layer enabling said foam interliner to be rolled upon itself without a release sheet therebetween.

\* \* \* \* \*